Patented Feb. 3, 1948

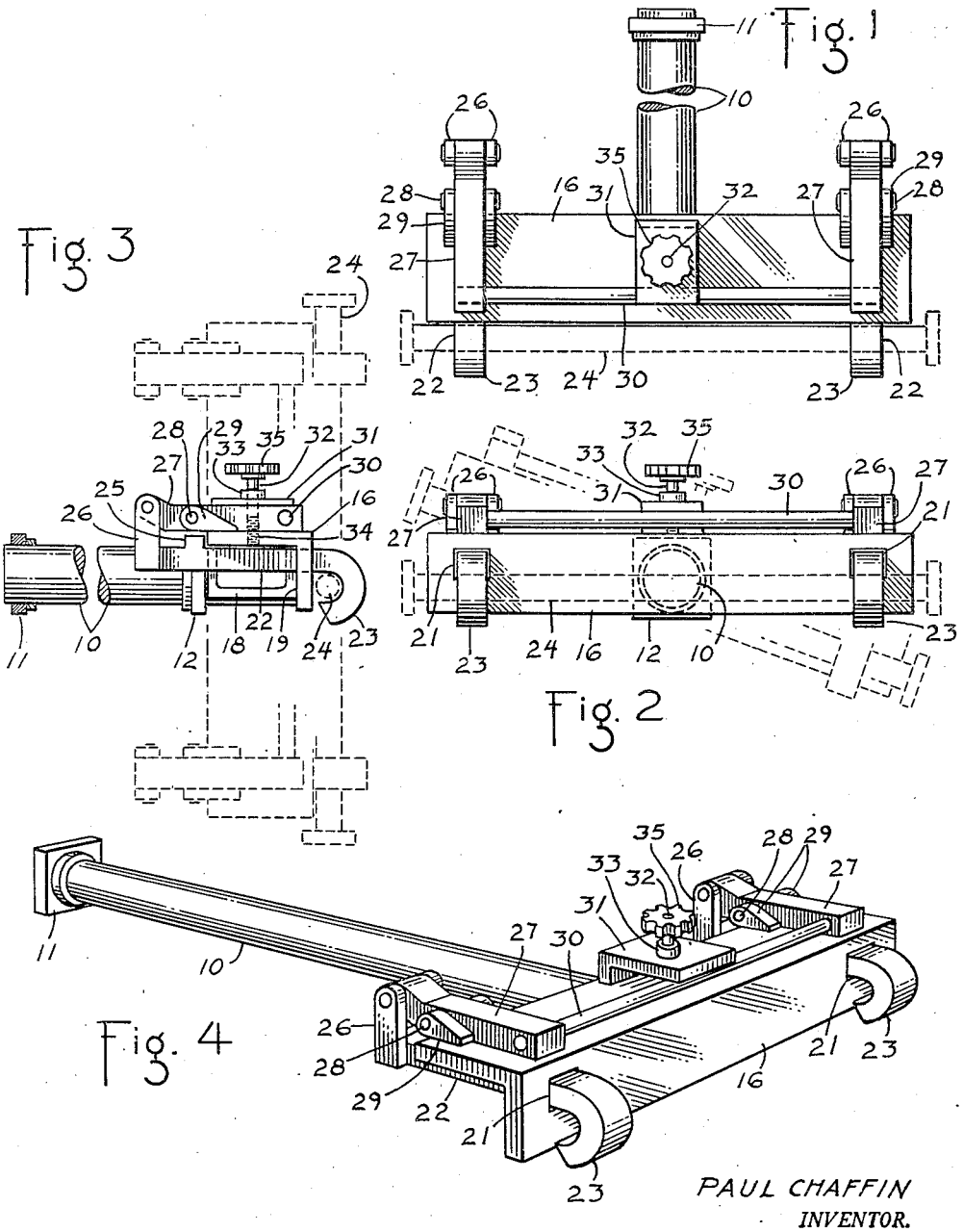

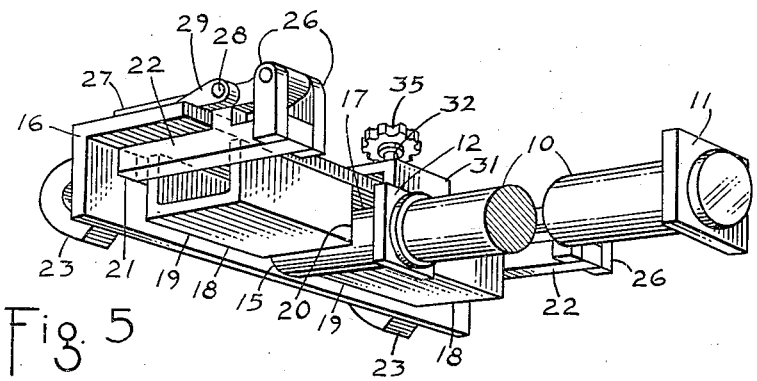
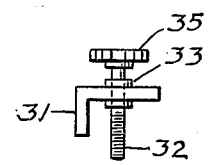
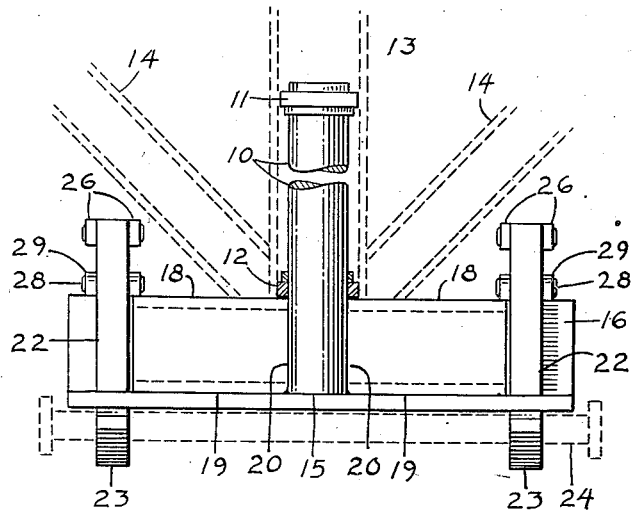
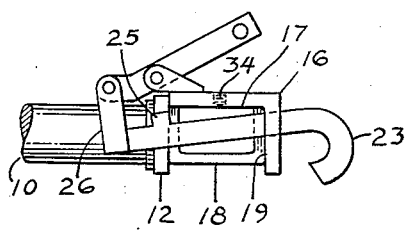
PAUL CHAFFIN
INVENTOR.

2,435,383

UNITED STATES PATENT OFFICE 2,435,383

TRAILER HITCH

Paul Chaffin, Harristown, Ill.

Application October 11, 1946, Serial No. 702,838

7 Claims. (Cl. 280—33.44)

This invention relates to trailer hitches and has for one of its objects to produce a hitching device of strength and durability, which is simple in structure, of light weight, possessing positive locking features, and having provision for movability and yieldability in its structure so as to compensate during road travel for differences in movement of its parts and those of the automobile or motor vehicle to which the trailer is attached and thereby drawn.

Other objects to be attained will hereinafter more fully appear in the following description.

A practical but non-limiting exemplification of the invention is illustrated in the accompanying drawings, wherein:

Figure 1 is a top plan view of the hitch assembly with the tail extension or draft-bar broken apart to fore-shorten the view;

Figure 2 is a front end view of the assembly;

Figure 3 is a side elevational view with the hitching-head of the device shown in dotted lines as turned at a right angle about the axis of the tail extension or draft-bar;

Figure 4 is a perspective view of the assembly looking downward from above and from the front thereof;

Figure 5 is a perspective view looking upward from below and from the rear of the assembly;

Figure 6 is a side view of the clamping element detached;

Figure 7 is a bottom plan view of the hitch assembly with the contiguous end portions of a trailer draft frame shown in dotted line; and Figure 8 is a fragmentary side elevational view similar to Figure 3 but showing the movable locking elements in opened and unlocked positions.

Referring now to the drawings in detail, the numeral 10 designates the tail extension or draft-bar of the device. The same is somewhat elongated and, obviously, may be either solid or tubular, as desired. This member 10, in practice, is mounted to rotate about its longitudinal axis. For this purpose, as shown, the tail extension or draft-bar 10 is supported rotatably at its rearward end in a rectangular bearing block or member 11 and adjacent its forward end in a similar bearing fitting 12. These bearing fittings 11, 12 or other suitable and equivalent members, are welded or otherwise suitably secured fixedly to a central longitudinal member (indicated by dotted lines as at 13 in Figure 7 of the drawings) of a draft frame of a trailer, for example such as shown in detail in a separate application filed and pending concurrently herewith. In this exemplification (see Figure 7) the forward bearing fitting 12 is secured to the middle frame member 13 at the apex of its junction with a pair of convergent side members 14 of the draft frame.

The forward end of the tail extension or draft-bar 10 is welded, as at 15, to the inner face of the vertical flange of an L-shape cross-head member 16 (see Figures 5 and 7). The side of the forward end portion of draft-bar 10 is further welded as at 17 (see Figure 5) to the inner face of the horizontal top flange of the cross-head member 16.

Located one on each side of the forward end portion of the tail extension or draft-bar 10 is a pair of channeled members or blocks 18 whose side face portions are welded to the adjacent inner face portions of the vertical and horizontal top flanges of the cross-head member 16, as at 19. The inner ends of these blocks or members 18 are also welded, as at 20, to the opposite sides of the forward end portion of the draft-bar 10.

The provision of the channel members or blocks 18 not only reinforces the cross-head member 16 but the welding of the inner ends of said members 18 to the sides of the adjacent end portion of the draft-bar 10, as at 20, greatly strengthens the attachment of the cross-head member 16 to the draft-bar 10.

Fitted longitudinally slidable through apertures 21 in the front vertical flange of the cross-head member 16 (see Figure 4) is a pair of lock members 22 having hooked forward ends 23. These hooked ends 23 of the members 22 are provided to engage a suitable attaching keeper which is provided on the rear end portion of an automobile or tractive motor vehicle. As indicated as an illustrative example and more or less schematically in Figures 1, 2 and 3, a conventional cross-bar 24 may be provided on the motor vehicle for engagement by said hooked portions 23 of the lock members 22. However, as just above stated, other suitable means may be provided for the purpose.

Each lock member 22, in its locking position, is held parallel and close to the under face of the horizontal top flange of the cross-head member 16 (see Figure 3). In this relative position of the member 22 the member is retracted longitudinally so that the hooked end 23 thereof is close to the vertical front flange of said member 16 and thus is in locking relation to hold the engaged keeper bar 24. In this relation, a lug 25 on the lock member 22 is engaged behind the outer edge of the horizontal top flange of the cross-head member 16 (see Figure 3) and thus holds the lock member 22 from forward longitudinal movement.

At the outer end of the lock member 22 is a pair of upstanding ears or lugs 26 to which is hinged the outer end of one of a pair of lever members 27. These lever members 27 are hinged intermediate their ends, as at 28, to ears or lugs 29 projecting upwardly and rearwardly from the horizontal top flange of the cross-head member 16. The forward ends of said lever members 27 are rigidly cross-connected by a bar 30 so that the members 27 can be made to move together or simultaneously the one with and by the other. By this provision, the lever members 27 may be simultaneously rocked up and down on their pivots 28, thereby moving the lock members 22 into and out of locking position at the will of an operator for readily and quickly attaching and detaching the trailer to and from the motor vehicle.

To securely hold the locking members 22 in their locking position and release the same, at will, an angular clamping element 31 is provided. One leg of this angular member 31 is vertically disposed and made to rest on the horizontal top flange of the cross head member 16, and a screw element 32 has a swivel-fitting 33 through a bearing hole in the horizontal other leg of said clamping member 31, while the threaded portion of the screw is fitted in a counterpart threaded opening 34 in the horizontal top flange of the cross-head member 16. The screw 32 is provided with a manipulating wheel or the like 35 at its upper end.

As the horizontal leg of the clamping member 31 overhangs the cross-connecting bar 30 of the lever members 27, the clamping member 31, by the tightening of the screw 32, holds the lever members 27 in their closed position and the lock members 22 in their retracted locking position. By the same token, when the screw 32 is loosened and the cross-connecting bar 30 is raised, the lock members 22 are moved forwardly so that their hooked ends 23 are then disengageable from the keeper bar 24 on the motor vehicle.

From the foregoing it is apparent that a positive draft connection is possible between a motor vehicle and a trailer truck, yet the rotative mounting of the tail extension or draft-bar 10 is such that certain independent movement is afforded both motor vehicle and trailer truck so as to compensate for unevenness in the roadway. Thus danger of undue strain upon either the motor vehicle or the trailer truck is avoided or at least greatly minimized.

The illustrated construction and arrangement is but one exemplification of the invention and modification and changes are contemplated within the spirit and scope of the appended claims. Therefore, the invention is not limited to the specific construction and arrangement shown.

What is claimed is:

1. A trailer hitch comprising an elongated draft-bar mountable with freedom of rotation about its longitudinal axis on the trailer, said draft-bar having a hitching cross-head at its forward end, a pair of longitudinally movable and upwardly and downwardly swingable lock members located respectively on said cross-head adjacent opposite ends of the same, the forward ends of said lock members having keeper-engageable hooks, lever members hingedly mounted on said cross-head in substantially parallel relation above said lock members, an operative connection between the rearward ends of said lock members and said lever members whereby movement of the lever members imparts either an opening or closing movement to said lock members depending upon the direction of movement of said lever members, and a releasable clamping member on said cross-head holding said lever members in the closed position of said lever members and that of said lock members and for releasing both sets of members, at will.

2. A hitch provision as set forth in claim 1, wherein the cross-head is of L-shape in cross section and the lock members are fitted longitudinally slidable through openings provided in a vertically disposed front flange of the cross-head and are swingable up and down from their support in such openings, said lock members in locking position being lifted closely adjacent the under side of the horizontally disposed opposite flange of the cross-head and each lock member having a lug portion to engage behind the outer edge of said horizontal cross-head flange in the closed position of the lock members and the lever members at the time said lever members rest on the top side of the horizontal flange of the cross-head.

3. A trailer truck hitch provision adapted more particularly for a caster-type twin-wheeled trailer truck to be attached to a motor vehicle having a transverse, horizontal bar-type, attachable keeper element at its rear end, such hitch provision comprising a longitudinal draft-bar having bearing fittings for supporting it longitudinally fixed medially on the trailer truck but enabling rotation of the bar about its longitudinal axis, a cross-head fixedly on the forward end of said draft-bar, a pair of laterally spaced apart lock members disposed one each longitudinally on opposite sides of said draft-bar, said lock members having hooked forward end portions projected ahead of said cross-head and each lock member being supported longitudinally slidable on the cross-head and with freedom of up-and-down swinging movement thereon, a pair of cooperative lever members mounted pivotally on said cross-head and located one each in working relation to one of said lock members, a hinged connection between each lever member and its companion lock member whereby a rocking movement of the lever member imparts a combined longitudinal and up or down swinging movement to the companion lock member so as to open or close the lock member depending upon the direction of movement of the lever member, cross-connecting means between said lever members whereby movement of the members is simultaneous and identical in either direction, and releasable clamp means cooperatively associated with said cross-connecting means and provided and adapted to engage and hold said cross-connecting means so as to retain said lock members in a retracted position and in engagement with the attachable keeper on the motor vehicle.

4. A hitch provision as set forth in claim 3, wherein the cross-head on the draft-bar is of L-shape in cross section and one of its flanges is vertically disposed and the other flange thereof is horizontal, the vertical flange having apertures therein and the respective lock members are fitted slidably and swingably supported in said apertures, and the lever members and the clamp means are located on the horizontal flange of the cross-head.

5. A trailer truck hitch, the same comprising a draft-bar having provision for its mounting longitudinally and medially on the trailer truck, said draft-bar being fixed against longitudinal movement but capable of rotative movement about its longitudinal axis in its mounting, a rigid cross-head on the forward end of said draft-bar, and lock members with releasable holding means on said cross-head, said lock members having attaching provision at their forward ends for detachable engagement with a keeper provision on the rear end of a tractive motor vehicle whereby the draft-bar is capable of up-and-down swinging movement from the attached keeper provision.

6. A trailer truck hitch, the same comprising a draft-bar having provision for its mounting longitudinally and medially on the trailer truck, said draft-bar being fixed against longitudinal movement but capable of rotative movement about its longitudinal axis in its mounting, a rigid cross-head on the forward end of said draft-bar, a spaced apart pair of longitudinally movable and vertically swingable lock members on said cross-head, the lock members being located one at each side of the draft-bar, lever means on said cross-head for moving said locking members into and out of locking position, said lock members having attaching provision at their forward ends for detachable engagement with a transverse bar-type of keeper provision on the rear end of a tractive motor vehicle whereby the draft-bar is capable of up-and-down swinging movement from the attached keeper provision, and clamp means on said cross-head for releasably holding said lever means.

7. A trailer truck hitch comprising a draft-bar mounted longitudinally fixed on the trailer truck but with freedom of rotative movement about its longitudinal axis, a rigid cross-head on the forward end portion of said draft-bar, said cross head being of L-shape in its cross-section and with one flange thereof vertically and forwardly disposed and its other flange horizontally disposed and at the top thereof, the draft-bar being welded at its forward end to the inner face of the vertical flange of the cross-head and welded at its side adjacent its end to the inner face of the horizontal top flange of the cross-head, reinforcing blocks located on opposite sides of the forward end portion of said draft-bar and welded at their sides to the adjacent inner face portions of the flanges of said cross-head, the inner ends of said reinforcing blocks being welded to the adjacent side portions of the draft-bar, and means on the cross-head for detachably connecting the cross-head to the rear end of a tractive motor vehicle.

PAUL CHAFFIN.

REFERENCES CITED

The following references are of record in the file of this patent:

UNITED STATES PATENTS

| Number | Name | Date |
| --- | --- | --- |
| 1,107,763 | Dain | Aug. 18, 1914 |
| 1,706,260 | Staley | May 19, 1929 |
| 2,060,066 | Goin | Nov. 10, 1936 |
| 2,119,263 | Bumgardner | May 31, 1938 |